Dec. 6, 1949     W. A. PENN     2,490,088
AUTOMOBILE SEAT HEADREST
Filed Sept. 5, 1947
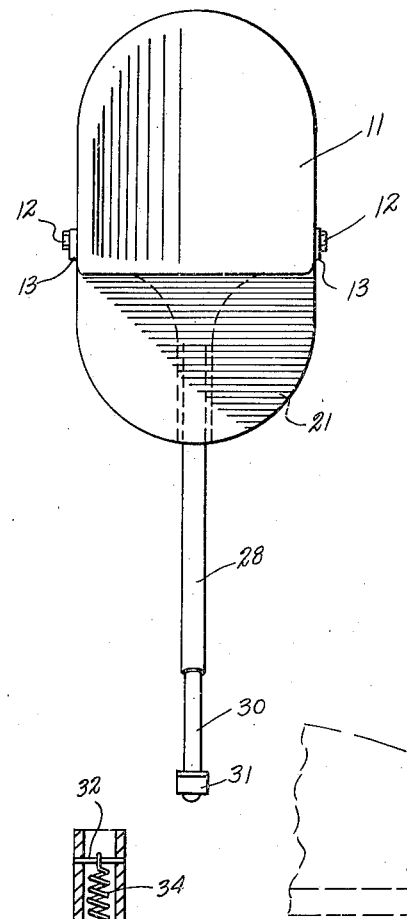
INVENTOR.
WILLIAM A. PENN,
BY
McMorrow, Berman + Davidson
ATTORNEYS.

/ Patented Dec. 6, 1949

2,490,088

UNITED STATES PATENT OFFICE 2,490,088

AUTOMOBILE SEAT HEADREST

William A. Penn, Marinette, Wis.

Application September 5, 1947, Serial No. 772,252

3 Claims. (Cl. 155—177)

This invention relates to head rest devices for vehicle seats, and more particularly to a detachable head rest unit adapted to be secured to the back of a vehicle seat and to extend above the normal height of the seat to function as a cushioned support for the head of a passenger.

A main object of the invention is to provide a novel and improved detachable head rest device adapted for securement to the back of a motor vehicle seat to provide a support for a passenger's head so that the passenger may sleep or otherwise relax in a comfortable position.

A further object of the invention is to provide an improved head rest unit of very simple construction which is inexpensive to manufacture, very easy to install and readily adjustable to a desired angle of inclination.

Further objects and advantages of the invention will become apparent from the following description and claims, and from the accompanying drawings, wherein:

Figure 1 is a front elevational view of a detachable head rest unit for an automobile seat constructed in accordance with the present invention.

Figure 2 is a side elevational view of the head rest unit of Figure 1 shown in installed position on the back of an automobile seat.

Figure 3 is a vertical cross-sectional enlarged detail view taken through the spring hook member of the head rest unit of Figure 1.

Figure 4 is an enlarged cross-sectional detail view taken on line 4—4 of Figure 2.

Figure 5 is an enlarged longitudinal cross-sectional detail view of the top portion of the head rest unit showing an alternative means of connecting the cushion-carrying element of the unit to the main supporting element of said unit.

Figure 6 is a top plan view of the modified structure shown in Figure 5.

Referring to the drawings, 11 designates a head rest cushion comprising a suitably rigid frame carrying a cushion matrix of foam rubber or the like, the frame and cushion matrix being covered with upholstering fabrics. The lower side edge portions of cushion 11 are pivotally secured at 12, 12 to a pair of upstanding lugs 13, 13 carried by a plate member 14 which is suitably curved to fit over the top of an automobile seat.

Secured to the intermediate portion of plate member 14 by bolts 15, 15 is a channel-shaped member 16 having inturned flanges 17, 17 embracing the side edges of plate member 14. Integral with member 16 and depending from its rear portion is a plate member 21 which is inclined downwardly and forwardly so that it will lie adjacent to the rear surface of a seat back 19 when the unit is positioned as shown in Figure 2. The bolts 15 pass through parallel slots 20, 20 formed in the plate member 14 so that the plate member 21 may be adjusted in accordance with varying thicknesses of automobile seat backs. Instead of adjustably securing the plate member 14 to the channel-shaped member 16 by means of the bolts 15, 15, the plate member 14 may be resiliently connected to said member 16 by a pair of springs 35, 35, as shown in Figures 5 and 6, the springs being secured to lugs 36 and 37 carried respectively the plate member 14 and the channel member 16. This provides an automatic adjustment between plate member 14 and channel member 16 to conform to the thickness of the top portion of an automobile seat back.

Plate member 14 carries at its rear central portion a pair of upstanding apertured lugs 22 between which is pivotally connected the end of an internally threaded sleeve member 23. Pivotally connected to the upper rear portion of cushion 11 is an internally threaded sleeve member 24 whose threads are opposite in sense to those of sleeve member 23. Threadedly engaged in the sleeve members 23 and 24 is a screw member 25 provided with a knurled intermediate flange 26. The respective threads on each side of the flange 26 correspond to and fit the threads in the respective sleeve members 23 and 24 so that by rotating the knurled flange 26 the inclination of cushion 11 with respect to plate member 14 may be varied.

Plate member 21 carries a downwardly directed sleeve member 18 and at its bottom end said sleeve member 18 is formed with a bayonet slot 27. Telescopically received in sleeve member 18 is a tubular member 28 having a bayonet pin 29 projecting therefrom which is lockingly engageable with the bayonet slot 27.

Slidably carried inside tubular member 28 is a smaller tubular member 30 at the bottom end of which is formed a forwardly projecting right-angled hook arm 31 adapted to engage under the bottom of the automobile seat back 19 in the manner shown in Figure 2. Secured in the upper portion of tubular member 28 is a transverse pin 32 and secured in the lower portion of tubular member 30 is a transverse pin 33. Connecting pins 32 and 33 is a coiled spring 34 which biases the tubular member 30 upwardly in tubular member 28.

Spring 34 provides a resilient clamping action whereby the top and bottom edges of the seat back 19 are respectively clampingly engaged by the top channel member 16 and the hook arm 31, as shown in Figure 2. This secures the head rest unit to the seat back 19 and allows the unit to be fitted to seat backs of varying height. To remove the unit from a seat back, the tubular member 30 is pulled downwardly against the tension of spring 34 whereby the hook arm 31 may be disengaged from the bottom of the seat back.

When the head rest unit is to be stored for future use, the tubular member 28 is detached from sleeve member 18 by disengaging the bayonet pin 29 from the bayonet slot 27 and withdrawing the tubular member 28 from the sleeve member 18.

The telescoping members 14 and 16 described above may alternatively be fabricated as tubular frames instead of plate elements, preferably connected internally by springs, in the manner shown in Figure 3, so that the telescoping frame members are automatically adjustable to conform to the variation in widths of the top portions of automobile seat backs as in Figure 5. By using tubing instead of plate elements the weight of the unit is reduced, the unit is lighter in appearance, and the cost of construction is decreased.

While a specific embodiment of an adjustable head rest unit for automobile seat backs has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A head rest comprising a support, an angled member secured to said support and adapted to engage the top of a seat back with an arm thereof depending adjacent the rear surface of the seat back, a downwardly directed sleeve carried by said arm, a first tubular member secured in said sleeve, a second tubular member telescopically received in said first tubualr member, a coiled spring connecting the upper portion of said first tubular member to the lower portion of said second tubular member, a hook element carried at the lower end of said second tubular member and engageable under the bottom edge of the seat back, whereby the support is resiliently clamped to the seat back, a cushion member pivotally connected to said support and extending upwardly therefrom, and strut means connecting the rear portion of said cushion member to said support.

2. A head rest comprising a support, an angled member secured to said support and adapted to engage the top of a seat back with an arm thereof depending adjacent the rear surface of the seat back, a downwardly-directed sleeve carried by said arm, a first tubular member secured in said sleeve, a second tubular member telescopically received in said first tubular member, a coiled spring connecting the upper portion of said first tubular member to the lower portion of said second tubular member, a hook element carried at the lower end of said second tubular member and engageable under the bottom edge of the seat back, whereby the support is resiliently clamped to the seat back, and a cushion member on said support.

3. A head rest comprising a support, an angled member secured to said support and adapted to engage the top of a seat back with an arm thereof depending adjacent to the rear surface of the seat back, a downwardly-directed member on said arm, a pair of telescoping members engaged in said first member, resilient means carried by said latter members for retractively biasing one of said telescoping members within the other, a hook element carried at the lower end of one of said telescoping members and engageable under the bottom edge of the seat back, whereby the support is resiliently clamped to the seat back, and a cushioned member on said support.

WILLIAM A. PENN.

REFERENCES CITED

The following references are of record in the file of this patent:

UNITED STATES PATENTS

| Number | Name | Date |
| --- | --- | --- |
| 313,781 | Starr et al. | Mar. 10, 1885 |
| 344,302 | Carrick | June 22, 1886 |
| 477,197 | Barker | June 21, 1892 |
| 668,765 | Beach | Feb. 26, 1901 |
| 1,597,355 | Fussell | Aug. 21, 1926 |